March 13, 1956    J. E. TOTH    2,737,996
TUBE EXPANDER INVOLVING AUTOMATIC ROLLER
SETTING AND RELEASE MECHANISM
Filed July 6, 1951    4 Sheets-Sheet 1
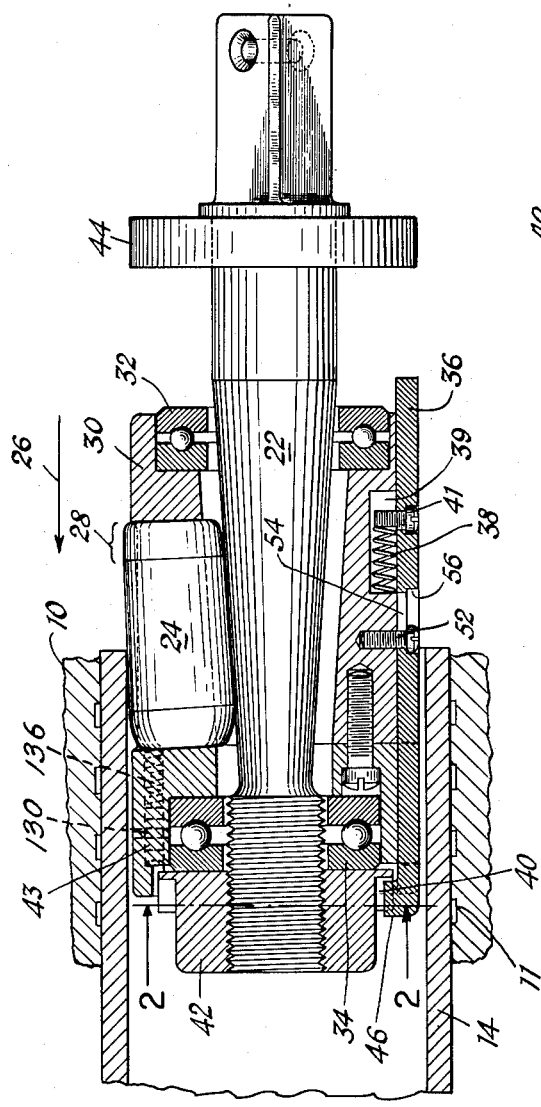
FIG. 1
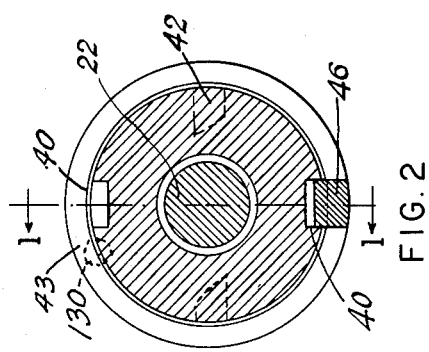
FIG. 2
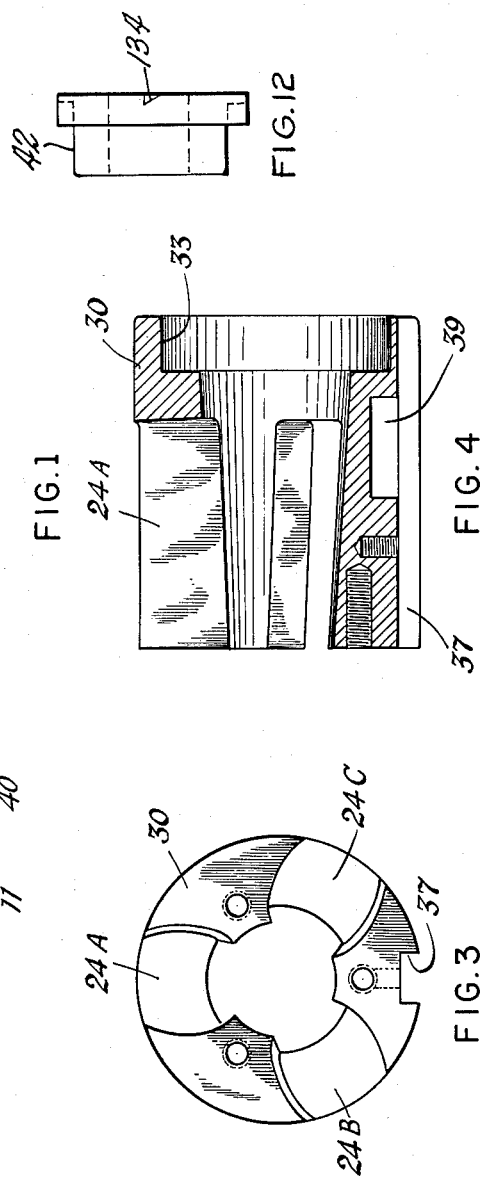
FIG. 12
FIG. 4
FIG. 3
INVENTOR
John E. Toth
BY
*KW Holbrook*
ATTORNEY March 13, 1956

J. E. TOTH 2,737,996

TUBE EXPANDER INVOLVING AUTOMATIC ROLLER
SETTING AND RELEASE MECHANISM

Filed July 6, 1951

INVENTOR
John E. Toth
BY
*W. Holbrook*
ATTORNEY

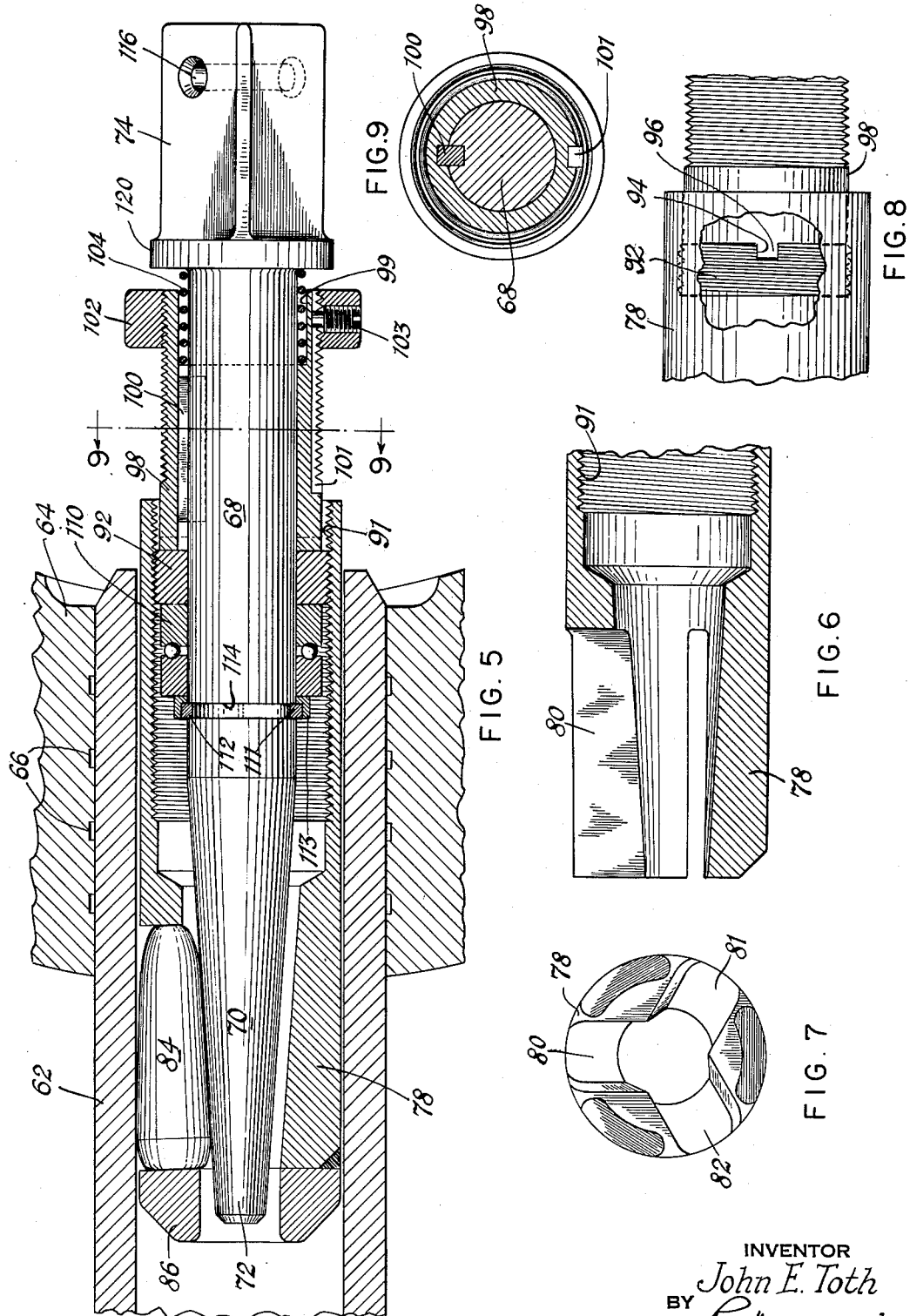

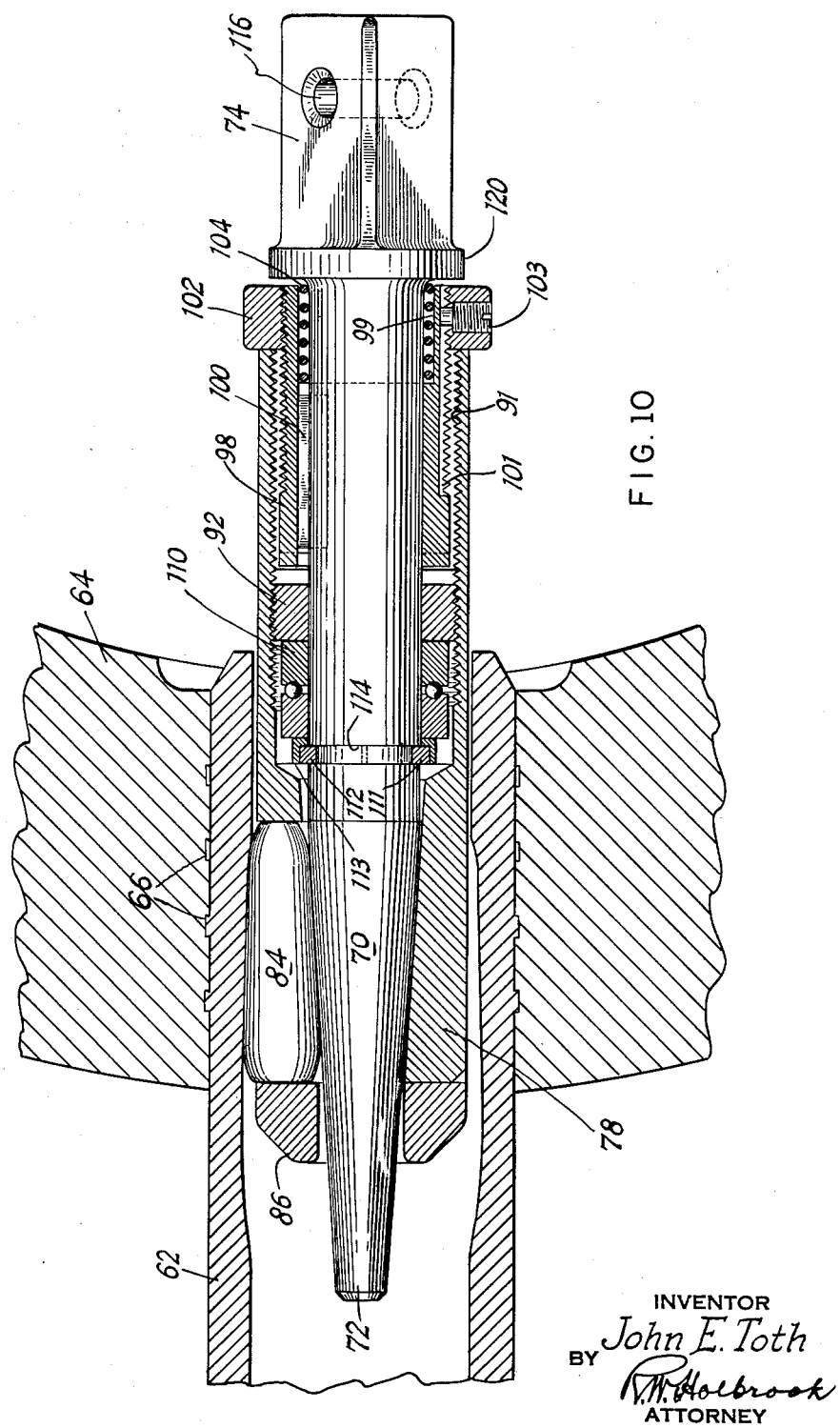

United States Patent Office 2,737,996
Patented Mar. 13, 1956

2,737,996

TUBE EXPANDER INVOLVING AUTOMATIC ROLLER SETTING AND RELEASE MECHANISM

John E. Toth, Akron, Ohio, assignor to The Babcock & Wilcox Company, Rockleigh, N. J., a corporation of New Jersey Application July 6, 1951, Serial No. 235,504

6 Claims. (Cl. 153—82)

This invention relates to tube expanders, and more particularly to a type of expander involving means for effecting automatic setting of the tube engaging elements of the expander.

In a more particular sense the invention relates to a multiple roller tube expander adapted to be inserted in a tube to be expanded. After insertion in the tube the mechanism of the expander is such that rotation of the expander mandrel first causes the automatic setting of the rollers to their operative positions. In other words, the initial rotation of the expander mandrel moves the tube engaging rollers outwardly radially of the expander body and into the operative tube engagement. Thereupon, the radial outward movement of the expander is automatically interrupted, although the mandrel continues to rotate in the same direction. Continued rotation of the mandrel in the same direction causes the rollers to progressively expand a portion of the tube by movement of the rollers in a helical path of small pitch. This action continues until the desired length of the tube has been expanded to a predetermined degree. Thereupon, reversal of the rotation of the mandrel automatically withdraws, or releases, the rollers from their operative positions so as to permit the entire expander to be withdrawn from the expanded tube. The type of expander covered by the invention is particularly useful in expanding tubes into fluid tight joint relationship with a tube circumscribing member, under circumstances where the portion of the tube to be expanded is remote from the open end of the tube. An example of such use of the expander occurs in a method of forming a pipe line in which a series of long pipe sections are joined by expanding the adjoining ends of pipe sections within a coupling, the expander being operated from a position beyond the free end of the last positioned pipe section.

Illustrative embodiments of the invention will be described below with reference to the accompanying drawings, and other objects and advantages of the invention will appear as the description proceeds.

In the drawings:

Fig. 1 is mainly a longitudinal section on the line 1—1 of Fig. 2 of a protractive incremental expander illustrating one embodiment of the invention;

Fig. 2 is a vertical section on the section line 2—2 of Fig. 1 looking in the direction of the associated arrows;

Fig. 3 is an end elevation of the expander body, particularly showing recesses in which the expander rollers are received;

Fig. 4 is a fragmentary view showing the expander body on an enlarged scale;

Fig. 5 is mainly a longitudinal section of an incremental multiple roller retractive expander involving an automatic setting of the expander rollers and illustrating another embodiment of the invention;

Fig. 6 is a partial vertical section of the left hand end of the expander shown in Fig. 5 with the expander rollers removed;

Fig. 7 is an end elevation of that part of the expander body shown in Fig. 6;

Fig. 8 is a partially broken away fragmentary side elevation of the drive motor end of the expander body, particularly showing the interlock between the coupling and the thrust ring which has screw-threaded engagement with the bore in the expander body;

Fig. 9 is a transverse vertical section on the line 9—9 of Fig. 5, looking in the direction of the associated arrows;

Fig. 10 is a longitudinal section similar to Fig. 5, but showing the relationship of the expander parts during the actual expanding of an associated tube.

Figure 11:
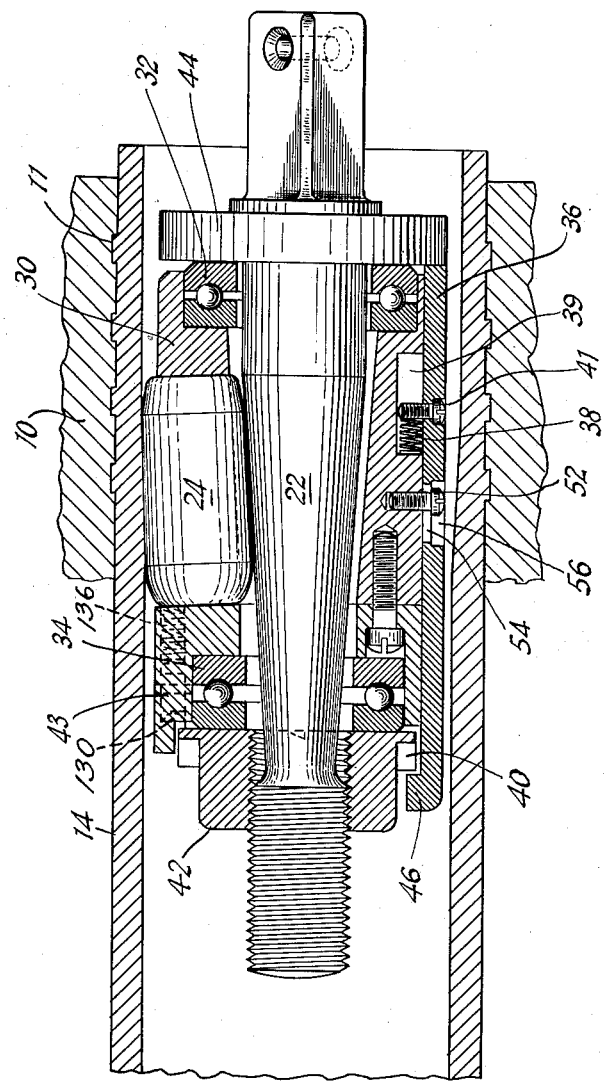
Fig. 11 is a longitudinal section similar to Fig. 1 but showing the relationship of the expander parts during the actual expanding of an associated tube.

Fig. 1 of the drawings shows an illustrative expander partially inserted within a tube 14 to be expanded within a circumscribing and closely fitting opening in a member 10, which has a tube seat including the transversely and axially spaced circumferential grooves 11. In a method of forming a pipe line, the member 10 may be a coupling enclosing the ends of two facing pipe sections similar to the pipe section 14. In that case, the motor coupling end of the expander has secured thereto a long operating rod which extends through the last pipe section to a motor. This operating rod is preferably marked or provided with indicia to facilitate the operation of the expander. Such indicia would permit the operator to readily determine when the expander has reached such a position as that indicated in Fig. 1 of the drawings, as will be understood from the following description. It would also tell the operator when the expander has finished the desired amount of tube expanding.

The above indicated reference to the use of the illustrative expander in pipe line construction is further illustrated in the pending application of Carl A. Maxwell, Ser. No. 196,971, filed November 22, 1950.

Starting at such a position as that indicated in Fig. 1, the expander mandrel 22 is rotated so as to cause the tube engaging rollers 24 to move outwardly radially into their tube expanding positions. After the rollers have reached these positions, the mechanism of the expander is such that continued rotation of the mandrel in the same direction does not further move the rollers radially outwardly, but rather causes the entire expander to advance through the section of pipe to be expanded, expanding the tube metal into the grooves 11 during such advancing movement. After the expander has finished expanding the desired tube section, the rotation of the mandrel is reversed so as to permit the tube engaging rollers to move inwardly from their tube expanding positions. It may be considered that they are thus retracted radially so that the entire expander can be freely withdrawn from the tube and the entire series of steps repeated in an adjacent tube.

The expander with its rollers is so constructed that when the mandrel is operated in one direction, it would be expanding the tube metal at any one instant, over only a small fraction of the length of the tube seat in the member 10. For example, the most active part of the expander extends over a part of the tube length not greater than the spacing of the successive grooves 11. Thus, referring to Fig. 1, and considering the expander as moving in the direction of the arrow 26, the most active part of the roller 24, insofar as flow of tube metal is concerned, is the section 28 of the roller at its right hand end. In the tube expanding operation, the metal of the tube section 14 would first be expanded into the first groove from the right hand end of the tube 14. Then, as the expander moves along to the left, the tube would be expanded and its metal caused to flow into the succeeding groove. There may be some flow of tube metal into the successive grooves before the most active portions of the rollers are effective on the immediately adjacent tube metal, but the grooves are not substantially filled with tube metal until the passage of the sections 28 of the rollers completely thereover. Continued operation of the expander makes it progressively effective over successive areas of the tube metal along a helical path until the last of the grooves in the member 10 toward the left hand side of that member is substantially filled with tube metal.

The body 30 of the expander is of tubular form with appropriate recesses, such as 24A, 24B and 24C (see Fig. 3), usually three in number, for receiving the tube engaging rollers 24. At opposite ends of the body there are ball bearings such as 32 and 34 to receive the thrusts involved in the operation of the expander and to promote its effective operation. These ball bearings are appropriately tightly fitted within recesses one of which (for the ball bearing 32) is clearly shown at 33 in Fig. 4 while the other recess for bearing 34 is formed within the closure ring 43. The body of the expander is also provided with a slide or sliding latch member 36 disposed within an appropriately shaped recess as indicated at 37 in Fig. 3. This latch member is biased to the right by a compression spring 38 seated within a recess 39 and normally abutting against a screw 41 secured to the member 36.

The spring 38 biases the latching end 46 of the member 36 into locking engagement with a notch 40 in the nut 42 which is threaded upon the leading end of the mandrel 22. When this nut is thus held against rotation relative to the body of the expander, rotation of the mandrel causes relative longitudinal movement between the mandrel and the body of the expander. In other words, the rotation of the mandrel moves the latter into the body of the expander and moves the tube engaging rollers 24 outwardly radially. The extent of this action is predetermined by the position of the stop collar 44 which is freely rotatably mounted upon the mandrel 22. In practice, this stop collar is positioned so as to give a predetermined number of turns of the mandrel before contact is made between the stop collar and the right hand or projecting end of the latch member 36. Further rotation of the mandrel in the same direction causes such relative motion between the stop collar and the latch member 36 that the latch member is moved toward the left relative to the body of the expander to release the latching end 46 of the member 36 from the notch 40 in the nut 42. Thereupon, the nut turns with the mandrel, in the actual tube expanding operation. The greater friction at the position of threaded engagement of the nut and the mandrel causes this action. The increased or greater friction between the nut 42 and the mandrel 22 (Fig. 1), at their interengaging threads is caused by the thrust of rollers 24 to the left in Fig. 1 (due to the lead angle of the rollers 24 and the rotation of the mandrel 22). This thrust is transmitted directly to the nut 42 through the interposed anti-friction bearing 34, and the closure ring 43.

At the end of the tube expanding action of the expander, the direction of rotation of the mandrel is reversed. The nut 42 may be restrained from rotation with the mandrel by the engagement of the spring pressed ratchet or pawl 130 against the axial and radial face 132 of one of a plurality of notches 134 in the nut 42 while continued rotation of the mandrel 22 unscrews the mandrel because of its threaded connection to the nut so that the mandrel moves to the right relative to the nut. This action continues until the end 46 of latch member 36 is again seated in a notch 40. Thereupon the pressure between the tapered portion of the mandrel and the rollers 24 is released, and with continued movement permits the rollers to move radially inwardly of the cage. Then the expander may be withdrawn from the tube so that the entire operation may be repeated in another tube. Before the next expanding is begun the nut 42 may be manually turned to seat the end 46 of the latch member 36 in one of the notches 40.

The pawl or ratchet 130 and its spring 136 are seated in an axial bore in the member 43 as indicated in Figs. 1 and 11, and the spring normally biases the pawl to the left and into such a path that it may become seated in one of the notches 134 in the nut 42 (Figs. 2 and 12). The sliding latch member 36 is held in its operative position against the body member by the head of screw 52, extending through a longitudinally extending slot 54 in the member 36 and threaded into the body member as clearly indicated in Fig. 1. The head of this screw extends out over the edges of the slot 54 and engages the bottom of the recess 56 in the latch member.

The above described expander is of particular advantage in the expanding of tubes within headers of relatively small diameter, where manual access to the position of the tube seat is limited. The expander is also characterized by such construction that the entire expander may move into the tube to be expanded. When the expander is to be used at the upper ends of upright tubes, the expander rollers are set as indicated in Fig. 1. This setting involves the positioning of the rollers so that their following portions or ends will be at such radial positions that the expander cannot be dropped into the tubes.

Relative to different terminology which may be used in referring to the expander and/or its components, the body 30 together with the closure ring 43, may be referred to as a barrel or hollow cage. The expander may be also referred to as having means operatively associating the expander body or cage with the mandrel in such a way as to cause the rollers to automatically move to their operative positions when the mandrel is rotated in one direction. This means may be also referred to as having an automatically releasable interlock operative to interrupt the outward radial movement of the expander rollers after a predetermined number of revolutions of the mandrel. The entire mechanism for associating the mandrel with the expander body to accomplish such results may also be referred to as interlock means. Such means would include the screw-threaded portions of the mandrel and the nut 42, the notch 40 for receiving the latching end 46 of the sliding latch member 36, the spring 38, and the stop collar 44. Specifically considered, the relationship of the nut 42 and the sliding latch member 36 constitutes an interlock.

The expander may be referred to as an incremental expander, referring to its operation whereby it operates only upon a very short section of the tube length at any given instant. The nut 42 may be referred to as a part which is non-rotatable with respect to the expander body through at least a part of the operative action of the expander.

With further reference to the relationship of the expander rollers and the mandrel, the longitudinal axis of at least one of the expander rollers forms an acute angle with a plane including the longitudinal axis of the mandrel. This forms a lead angle which causes the expander to automatically move along a part of the tube to be expanded.

The right hand end of the expander mandrel is squared to form a drive motor coupling, and this squared end may have two of its opposite surfaces connected by a passage for receiving a bolt or other means for securing a motor to the mandrel.

The recesses 24A, 24B, and 24C may be also referred to as cavities for normally receiving the tube engaging rollers. These rollers may be referred to as having a taper which is reversely related to the taper of the mandrel 22 and, conversely, the mandrel may be referred to as having a reversely tapered portion with respect to the rollers.

The expander indicated in Fig. 5 of the drawings is an incremental retractive roller expander so constructed that there is automatic setting of the rollers in their operative positions and automatic releasing of the rollers upon reversal of the rotation of the mandrel at the end of the expanding operation. This expander is adapted to perform in one pass, the entire expanding operation including the tightening of the tube 62 into the closely fitting tube seat within the member 64, this tube seat having therein annular grooves 66 similar to those above described with reference to the Fig. 1 expander. This expander is capable of operation whereby a tube will be tightened within a tube seat and rolled to such an extent that the metal of the tube will flow successively into the multiple grooves of the tube seat. The Fig. 5 expander has a mandrel so tapered that it decreases in diameter in a direction opposite to the direction of operative advance of the expander, with the load at such a position as that indicated at 70 in Fig. 5, between the small end 72 of the tapered portion of the mandrel and the position of the power source at the motor drive coupling 74 at the opposite end of the mandrel. This expander involves a cylindrical body 78, the left hand end of which is formed with recesses 80—82 (Fig. 7) for receiving a corresponding number of rollers 84, constructed and operated in a manner somewhat similar to that of the rollers of the Fig. 1 expander. These rollers are prevented from moving out of the recesses by the formation of the latter with re-entrant edges at the circumferential surface of the expander body and the rollers are held endwise in the recesses by a ring cap 86 welded to the mandrel body, or otherwise integral therewith.

The interior surface of the right hand portion of the expander body is formed with internal screw threads 91 for operative engagement with similar threads formed exteriorly upon the thrust ring 92 which has one or more rectangular notches such as 94 (see Fig. 8) for interlocking engagement with a projection 96 upon tubular coupling 98 slidably mounted on the right hand portion of the mandrel and keyed for rotation therewith by the key 100. The thrust ring 92 is rotatively mounted on the mandrel 68. Mounted upon the right hand end of the coupling 98 is an adjusting collar or stop collar 102 which carries a set screw 103 normally seated in a groove 101 in the coupling. Mounted within a recess 99 in the coupling 98 radially inwardly of the stop collar 102 is a compression spring 104 normally biasing the coupling 98 into interlocked position with the member 92, as indicated in Fig. 8. The left hand surface of the thrust ring 92 contacts the bearing 110 which is held in its operative position by a retaining device seated within an annular recess 114 formed in the body of the mandrel 68. This retaining device includes two semi-circular steel pieces 111 and 112 within retainer ring 113.

The drive motor coupling end 74 of the expander mandrel is a squared end through opposite surfaces of which extends a bore 116 for reception of a bolt or other similar device for securing the end of a long operating rod or other power transmitting element to the expander.

The operation of the Fig. 5 expander is begun with the expander positioned within the tube and the expander components in the relationships indicated in Fig. 5. With the expander in this position the driving motor rotates the mandrel in such a direction that the body 78 and the rollers 84 are moved axially to the right relatively to the mandrel 68—70 as said body slowly revolves, as a result of the threaded engagement of the thrust ring 92 within the body 78, the interlock (96 and 94) between the thrust ring 92 and the coupling 98, and the slidable key connection between the mandrel and the coupling. This causes the coupling 98 and the thrust ring 92 to rotate with the mandrel and at a faster speed than the more slowly revolving body 78, the interlock between the coupling 98 and the thrust ring 92 being maintained by the coil spring 104 disposed around the mandrel and in the recess 99. This action continues until the left hand end portions, or most effective portions of the rollers 84 have effectively engaged the tube metal. At that time the right hand end of the body of the expander will reach engagement with the stop 102 and will then move the coupling 98 to the right and towards the flange 120 of the drive motor coupling 74 to such an extent as to release the Fig. 8 interlock between the coupling and the thrust ring 92. The mandrel thereafter rotates relative to the thrust ring 92 while the tube is being expanded against the tube seat and the entire expander is caused to move out of the tube by the self-feeding action of the expander. This self-feeding action results from the provision of a lead angle between the longitudinal axis of the mandrel and the longitudinal axes of the rollers.

The Fig. 5 expander is of increased strength because of the position of the load, or resistance, at a portion of the mandrel of a diameter greater than the neck of the mandrel. In other words, the neck or portion of the mandrel of smallest diameter is not disposed between the load and the power source as in the expander shown in the patent to Maupin 1,747,723. This arrangement maintains the stresses in the mandrel at such a satisfactory distribution that the resistance of the expander to breakage is substantially enhanced, and this characteristic also applies to the embodiment of the invention illustrated in Fig. 1 of the drawings. The Fig. 5 mandrel is also automatic in its operation both as to the setting of the tube engaging rollers in their metal deforming positions, and as to the release of the rollers from such positions at the end of the expanding operation. The automatic release of the rollers 84 (Fig. 5) from their tube deforming positions (Fig. 10) is caused by reversal of the direction of rotation of the mandrel, effecting an unscrewing action after the set screw 103 is backed off and the collar 102 turned counter-clockwise to allow the interlock (94, 96) to re-establish itself. It is also to be noted that the Fig. 5 expander is out of the tube 62 when the expanding operation is completed; also that there is only a small clearance between 92 and 98 in Fig. 10. There may then be tolerance enough in the fitting of the parts that the operator may manually cause the members 98 and 92 to engage so that the interlock may be fully re-established by reversing the mandrel rotation.

A plurality of factors contribute to the movement of the Fig. 1 expander to the left during its operative tube expanding. Such factors also apply to the reverse movement, or action, of the Fig. 5 expander. These factors include the character of the mandrel threads and the coacting threads; the lead angle of at least one of the tube engaging rollers of each expander; and the direction of operating rotation of the mandrel. In the Fig. 1 protractive expander, the threads of nut 42 and mandrel 22 are right hand threads, and the mandrel is turned clockwise during its operative action. The lead angle of at least one of the rollers 24 is the angle required to advance the mandrel and the cage to the left with such clockwise turning of the mandrel.

Likewise the internal threads 91 of the expander body 78, and the threads of the thrust ring 92 of the Fig. 5 expander may be right hand threads for a clockwise turning of the mandrel 68 during the operative action of the expander. The lead angle of the rollers 84 is the angle required to effect the operative relative movement of the mandrel and the cage for the clockwise mandrel rotation, or the angle required to effect the operative movement of the expander.

In considering the Fig. 1 expander and the Fig. 5 expander relative to the common characteristic features, it will be evident from the foregoing description, that complete operation of each expander may be considered as including a number of cycles. The first cycle may be considered as the roller expanding cycle or the roller presetting cycle in which the rollers are moved to their operative positions.

This means the cycle during which the tube engaging rollers are moved outwardly radially with respect to the longitudinal center line of the pertinent mandrel or the expander body or the roller cage. In the operation of the Fig. 1 expander, this first cycle of operation takes place, for instance, starting with the parts in their relative relations indicated in Fig. 1. The cycle begins, for instance, with the clockwise rotation of the mandrel 22. This rotation due to the right hand threads on the left hand end of the mandrel causes the mandrel to move to the left relative to the nut 42. In other words, the mandrel is screw threaded into the nut. This action also moves the tube engaging rollers 24 outwardly radially with respect to the mandrel and the roller cage or expander body 30.

The roller expanding cycle of the Fig. 5 expander may be considered as beginning with the expander in the position indicated in Fig. 5. This figure is intended to indicate the expander in starting position within the tube 62. It is also intended to indicate a condition in which the radial position of each of the tube expanding rollers 84 is such that the entire expander may be readily moved as a unit into the tube.

With the parts in their position as indicated in Fig. 5 the mandrel is turned clockwise. This action, through the automatically releasable interlock including the key 100, the sleeve 98, the collar 102, the thrust ring 92 in its screw threaded relationship to the roller cage or the expander body, results in relative longitudinal movement between the mandrel 68-70 and the expander body 78. In such movement the expander body 78 may be considered as moving to the right and/or the mandrel may be considered as moving to the left. In any event, this relative movement moves the tube engaging rollers 84 outwardly radially with respect to the mandrel, the expander body 78, and the tube 62.

The roller expanding cycle referred to in the immediately preceding paragraph is terminated by the engagement of the right hand end of the expander body 78 with the collar 102 and the movement of the collar 102 and its sleeve 98 to the right sufficiently to disengage the driving connections between the collar 98 and the thrust ring 92. After the termination of the roller expanding cycle of either expander, a continuation of the previous rotation of the mandrel effects a second cycle which might be termed the operative or actual tube expanding cycle of the expander operation. It is the cycle during which the flow of tube metal is effected, in expanding the tube or pressing the tube outwardly radially against its tube seat. With particular reference to the Fig. 1 expander, this second cycle of operation begins immediately upon the displacement of the latching end 46 of the member 36 from the notch 40 in the nut 42. This displacement may be considered as being cause by the movement of the collar or annular member 44 to the left to contact the end of 36 and move it sufficiently to the left relative to the body of the expander to release 46 from the notch 40. Thereupon the lead angle of the roller 24 relative to the rotation of the mandrel and relative to the longitudinal center line of the mandrel causes the expander to be threaded or advanced along a helical path into the tube, expanding the tube as the threading or advancing action proceeds.

Fig. 10 illustrates the relationship of the parts of the Fig. 5 expander as the second cycle, or tube expanding cycle, or operative cycle of the expander takes place. During this cycle the mandrel 70 may be considered as being rotated clockwise. During this rotation the lead angle of the roller 84 is such relative to the direction of the rotation of the mandrel and relative to the longitudinal axis of the angle that the entire expander is threaded or retracted along a helical path to the right part or outwardly of the tube 62.

Each of the expanders clearly involves a rotatable mandrel with a tapered operative section. This may be termed the first component of each expander. Also, each expander has a second component which includes a roller cage or expander body having recesses therein in which the tube engaging rollers are disposed.

Each of the expanders has also a component constituting an automatically releasable interlock including the latching member (36 or 98) and the notched nut 42, or the equivalent member 92, which clearly are shown. Fundamentally the nut 42 has also been described as releasably locked against rotation relative to the roller cage during the first cycle of the operation of the expander. It has also been described as releasable from that locked condition during the tube expanding cycle which may also be equally well referred to as the second cycle or the operative cycle of the expander.

The automatically releasable interlock of the Fig. 10 expander includes the screw threaded section of the expander body 78 and the thrust ring 92 mounted upon the mandrel and having external screw threads in operative relation to the internal screw threads 91 of the expander body.

The automatically releasable interlock of the Fig. 10 expander has been described as including a part (i. e. the thrust ring 92) in screw threaded relationship to the expander body or roller cage 78 which may be considered as the second component of the Fig. 10 expander. The element 92 has also been described as locked against rotation relative to the mandrel 70 during the roller expanding cycle. The mandrel 70 may be considered as the first component of the Fig. 10 expander. The thrust ring 92 has also been described as released from locked condition during the tube expanding cycle of the expander operation. From the disclosure and from the foregoing description it should be clear that the automatically releasable interlock in either case includes unitary means movable relative to the mandrel and the cage in the first cycle of the expander operation. In the Fig. 1 expander this unitary means is the slide member 36 which is movable relative to the mandrel and the cage during the first cycle of the expander operation. In the Fig. 5 expander this unitary means may be considered as the sleeve 98.

Whereas in accordance with the revised statutes the invention has been described with reference to certain preferred embodiments, it is to be appreciated that the invention is not limited to all of the details thereof, but that it is rather of a scope corresponding to the scope of the subjoined claims.

What is claimed is:

1. In a multiple roller retractive tube expander; an expander body presenting a hollow cage supporting a plurality of tube engaging rollers; a mandrel having a tapered portion normally projecting into said hollow cage with said tapered portion contacting said rollers; and means for advancing said mandrel into said cage by rotation of said mandrel with said tapered portion forcing said rollers radially outwardly of said cage; said means including an automatically releasable interlock associated with said mandrel and said cage to interrupt the outward radial movement of the rollers when the rollers have reached their operative tube expanding positions; continued rotation of the mandrel in the same direction after said interruption effecting the actual tube expanding action of the expander; said means and interlock including an externally threaded thrust ring mounted on the mandrel and having screw threaded engagement with the bore of the cage near the end of the latter opposite the rollers; a coupling having a tooth and notch engagement with said thrust ring as a part of the interlock; said coupling being slidable but non-rotatively mounted on the mandrel and having an adjustable stop collar; a compression spring disposed around the mandrel and in a recess in the coupling for holding the coupling and the thrust ring in interlocking engagement until there is contact between the stop collar and the cage and further relative movement of the cage and the mandrel to compress the spring and release said interlocking engagement between the thrust ring and the coupling.

2. In a multiple roller incremental and progressive tube expander for forming pressure-tight tube and tube seat connections and characterized by operation including a roller expanding cycle and a subsequent expander advancing and tube expanding cycle effective only while the rollers are maintained in their maximum radially outward positions with both cycles effected by rotation of the mandrel in the same direction, the expander being operative to expand a tube by advance of the expander along the tube while the maximum metal flow action is effective only upon a small fraction of the entire pertinent tube length at any one instant of the expander operation, a first component including a rotatable mandrel having a tapered operative section, a second component including a roller cage having recesses in which tube and mandrel engaging rollers are disposed, a third component presenting an automatically releasable interlock including operatively engaging parts one of which has screw-threaded relationship with one of the first two components and is releasably locked against rotation relative to the other of the first two components during the roller expanding cycle and released from said locked condition during the tube expanding cycle, said interlock with its relationships to the remaining components constituting means for radially outwardly moving the rollers during the first cycle of expander action and for interrupting said radially outward movement when the rollers have reached their optimum or maximum radially outward positions and also constituting means for bodily advancing the expander to effect its actual tube expanding action while the rollers are maintained in their optimum or maximum radially outward positions.

3. In a multiple roller incremental and progressive tube expander operative to expand a tube by advance of the expander along the tube while the maximum metal flow action is effective upon only a small fraction of the entire pertinent tube length at any one instant of the expander operation; a hollow cylindrical expander cage having circumferentially distributed openings; tapered tube engaging expander rollers normally disposed within said openings; a mandrel rotatively disposed within said cage and having a tapered portion engaging said rollers; and an automatically releasable interlock co-acting with the mandrel and said cage and responsive to rotation of the mandrel in one direction to expand the rollers to their maximum outwardly radially expanded positions, then to automatically stop the outwardly radial movement of the rollers as a predetermined number of mandrel revolutions have taken place, and finally to maintain the rollers set in their radial positions as continued rotation of the mandrel in the same direction as before advances the expander through the tube seat to be expanded; said interlock including co-acting and interlocked elements one of which is movable with and by the cage longitudinally of the mandrel to release the interlock after a predetermined extent of such movement has taken place.

4. In a multiple roller incremental tube expander of the retractive type; a mandrel having a power transmitting portion at one end and a tapered portion at its other end with the minimum diameter of the tapered portion disposed at the end of the mandrel and maximum diameter of the tapered portion disposed between the small end of the tapered portion and the power transmitting portion; a hollow cylindrical expander cage having circumferentially distributed roller receiving openings near one end and an externally threaded portion near its other end; the cage being normally disposed around the mandrel; a plurality of tube and mandrel engaging rollers normally disposed in said openings and engaging the tapered portion of the mandrel; and an automatically releasable interlock co-acting with the mandrel and said cage responsive to the rotation of the mandrel in one direction to first expand the rollers to their maximum radially outward positions and then automatically stop the outwardly radial movement of the rollers as the rotation of the mandrel continues and after a predetermined number of mandrel revolutions have taken place, and finally maintaining the rollers set in their maximum outward positions as continued rotation of the mandrel in the same direction as before advances the expander through the tube seat to be expanded; said automatically releasable interlock including co-acting and interlocked elements one of which is movable with and by the cage longitudinally of the mandrel to release the interlock after a predetermined extent of such movement has taken place, said one of the co-acting elements constituting a sleeve rotatable with the mandrel and slidable longitudinally thereof in releasing the interlock, the other of said co-acting elements having a notch and tooth engagement with the first of said elements and constituting an annular member rotatably mounted around the mandrel and having external screw-threads whereby it is threaded into the internally threaded end of the mandrel.

5. In a multiple roller incremental and progressive tube expander for forming pressure-tight tube and tube seat connections and characterized by operation including a roller expanding cycle and a subsequent expander advancing and tube expanding cycle effective only while the rollers are maintained in their maximum radially outward positions, with both cycles effected by rotation of the mandrel in the same direction, the expander being operative to expand a tube by advance of the expander along the tube while the maximum metal flow action is effective only upon a small fraction of the entire pertinent tube length at any one instant of the expander operation, a first component including a rotatable mandrel having a tapered operative section, a second component including a hollow roller cage having recesses in which tube and mandrel engaging rollers are disposed, the hollow roller cage normally having the tapered section of the mandrel projecting therein, and means for advancing the mandrel into the cage, said means including a third component presenting an automatically releasable interlock including operatively engaging parts one of which has screw-threaded relationship with the mandrel and is releasably locked against rotation relative to the cage during the roller expanding cycle and released from said locked condition during the tube expanding cycle, said interlock with its relationships to the remaining components constituting means for radially outwardly moving the rollers during the first cycle of expander action and for interrupting said radially outward movement when the rollers have reached their optimum or maximum radially outward positions and also constituting means for bodily advancing the expander to effect its actual tube expanding action while the rollers are maintained in their optimum or maximum radially outward positions.

6. In a multiple roller incremental and progressive tube expander for forming pressure-tight tube and tube seat connections and characterized by operation including a roller expanding cycle and a subsequent expander advancing and tube expanding cycle effective only while the rollers are maintained in their maximum radially outward positions, with both cycles effected by rotation of the mandrel in the same direction, the expander being operative to expand a tube by advance of the expander along the tube while the maximum metal flow action is effective only upon a small fraction of the entire pertinent tube length at any one instant of the expander operation, a first component including a rotatable mandrel having a tapered operative section, a second component including a roller cage having recesses in which tube and mandrel engaging rollers are disposed, a third component presenting an automatically releasable interlock including operatively engaging parts one of which has screw-threaded relationship with one of the first two components and is releasably locked against rotation relative to the other of the first two components during the roller expanding cycle and released from said locked condition during the tube expanding cycle, said interlock with its relationships to the remaining components constituting means for radially outwardly moving the rollers during the first cycle of expander action and for interrupting said radially outward movement when the rollers have reached their optimum or maximum radially outward positions and also constituting means for bodily advancing the expander to effect its actual tube expanding action while the rollers are maintained in their optimum or maximum radially outward positions, said interlock including a nut screwthreaded upon the leading end of the mandrel, a stop fixed to the mandrel near its following end, and a sliding latch member carried by the cage and having one end in interlocking engagement with the nut during the radially outward movement of the rollers and having its other end in position to engage said stop to release the interlocking engagement between the nut and the sliding member to terminate outward radial movement of the rollers.

References Cited in the file of this patent

UNITED STATES PATENTS

| | | |
|---|---|---|
| 1,305,808 | Key | June 3, 1919 |
| 1,410,464 | Gallon | Mar. 21, 1922 |
| 1,439,568 | Maupin | Dec. 19, 1922 |
| 1,516,704 | Braun | Nov. 25, 1924 |
| 1,601,329 | Slesazeck | Sept. 28, 1926 |
| 1,610,463 | Mirfield | Dec. 14, 1926 |
| 1,619,479 | Maupin | Mar. 1, 1927 |
| 1,683,044 | Mongeau | Sept. 4, 1928 |
| 1,944,338 | Wiedeke | Jan. 23, 1934 |
| 1,987,608 | Dewald | Jan. 15, 1935 |
| 2,045,787 | Maupin | June 30, 1936 |
| 2,085,447 | Plaine | June 29, 1937 |
| 2,219,784 | Maupin | Oct. 29, 1940 |
| 2,298,703 | Key | Oct. 13, 1942 |
| 2,373,097 | Boyles | Apr. 10, 1945 |
| 2,383,214 | Prout | Aug. 21, 1945 |
| 2,546,756 | Knowlton | Mar. 27, 1951 |

FOREIGN PATENTS

| | | |
|---|---|---|
| 19,788 | Great Britain | Oct. 4, 1901 |